(12) United States Patent
Eswaran et al.

(10) Patent No.: US 11,138,526 B2
(45) Date of Patent: Oct. 5, 2021

(54) CRIME ANALYSIS USING DOMAIN LEVEL SIMILARITY

(71) Applicant: CONDUENT BUSINESS SERVICES, LLC, Dallas, TX (US)

(72) Inventors: Sharanya Eswaran, Bangalore (IN); Shisagnee Banerjee, Kolkata (IN); Avantika Gupta, U. P. (IN); Tridib Mukherjee, Bangalore (IN); Todd Redmond, San Diego, CA (US)

(73) Assignee: Conduent Business Services, LLC, Florham Park, NJ (US)

( * ) Notice: Subject to any disclaimer, the term of this patent is extended or adjusted under 35 U.S.C. 154(b) by 249 days.

(21) Appl. No.: 15/995,339

(22) Filed: Jun. 1, 2018

(65) Prior Publication Data

US 2019/0370704 A1 Dec. 5, 2019

(51) Int. Cl.
| | | |
|---|---|---|
| G06K 9/00 | (2006.01) | |
| G06Q 10/04 | (2012.01) | |
| G06F 17/10 | (2006.01) | |
| G06K 9/62 | (2006.01) | |
| G06F 16/29 | (2019.01) | |
| G06F 16/901 | (2019.01) | |
| G06F 16/907 | (2019.01) | |

(52) U.S. Cl.
CPC ............ *G06Q 10/04* (2013.01); *G06F 16/29* (2019.01); *G06F 16/901* (2019.01); *G06F 16/907* (2019.01); *G06F 17/10* (2013.01); *G06K 9/6218* (2013.01)

(58) Field of Classification Search
None
See application file for complete search history.

(56) References Cited

U.S. PATENT DOCUMENTS

| | | | | |
|---|---|---|---|---|
| 9,805,311 | B1 * | 10/2017 | Mohler | G06N 7/005 |
| 9,875,492 | B2 * | 1/2018 | Dupray | H04W 4/029 |
| 10,621,462 | B2 * | 4/2020 | Watts | G01C 21/3679 |
| 2014/0344277 | A1 * | 11/2014 | Layson | G06F 16/29 |
| | | | | 707/737 |

OTHER PUBLICATIONS

Agrawal, R., & Ramakrishnan, S., "Fast algorithms for mining association rules in large databases." In International Conference on Very Large Data Bases, VLDB (1994).
Mohler, et al, "Self-Exciting Point Process Modeling of Crime," Journal of the American Statistical Association 106:493:100-108 (2012).
CrimeStat: Spatial Statistics Program for the Analysis of Crime Incident Locations. http://www.nij.gov/topics/technology/maps/pages/crimestat.aspx.

(Continued)

*Primary Examiner* — Tuankhanh D Phan
(74) *Attorney, Agent, or Firm* — Jones Robb, PLLC (57) ABSTRACT

Datasets relating time information to crime occurrences in the geographical regions are received. Time based crime patterns are extracted. Based on similarities among the crime patterns, the geographical regions are clustered. A selected time series dataset is augmented with a second time series dataset from the same cluster. Based on the augmented time series dataset, a new crime pattern is extracted. Based on the new crime pattern, a crime forecast is made for the selected geographical region.

13 Claims, 6 Drawing Sheets

(56) References Cited

OTHER PUBLICATIONS

Wang et al., "Learning to detect patterns of crime." Machine Learning and Knowledge Discovery in Databases (2013).
Eck et al., "Mapping crime: Understanding hotspots." National Institute of Justice.
Neema & Bohning, "Improved methods for surveying and monitoring crimes through likelihood based cluster analysis." International Journal of Criminology and Sociological Theory (2010).
Parvez et al., "A Novel Approach to Identify Spatio-Temporal Crime Pattern in Dhaka City." In ACM ICTD (2016).
"U. S. Port Ranking by Cargo Volume." American Association of Port Authorities.
"Rust Belt." h.ps://en.wikipedia.org/wiki/Rust Bell.
"List of College Towns." h.ps://en.wikipedia.org/wiki/List of college towns.
"100 Best Places to Retire." h.p://www.topretirements.com/communities/100 best places to retire.html.
"Cities with the most and least diversified economies." h.ps://wallethub.com/edu/cities-with-the-most-least-diversified-economies/10852/.

* cited by examiner

CRIME ANALYSIS USING DOMAIN LEVEL SIMILARITY

FIELD

Embodiments relate generally to crime analytics and crime forecasting.

TECHNICAL BACKGROUND

Crime analysis is a law enforcement function that involves identifying patterns and trends in crime and disorder. To see if a crime fits a known pattern or is part of a new pattern is often tedious work of crime analysts, detectives, officers and/or deputies. Piles of paperwork and evidence are manually examined to, hopefully, predict, and prevent crime.

Overview

In an embodiment, a method of operating a crime forecasting system, includes receiving a first time series dataset that is associated with a target geographical region. This first time series dataset relates time information to crime occurrences in the target geographical region. A first time based crime pattern is calculated based on the first time series dataset. Clustering information is received that relates the target geographical region to a first set of substantially non-overlapping geographical regions where the first set of non-overlapping geographical regions include the target geographical region. The first time series dataset is augmented with a second time series dataset to create an augmented time series dataset. The second time series dataset to be based on at least one time series dataset relating time information to crime occurrences in at least one of the first set of non-overlapping geographical regions that are not the target geographical region. A second time based crime pattern is calculated based on the augmented time series dataset. Based on the second time based crime pattern, a crime pattern for the target geographical region is forecast.

In an embodiment, a method of forecasting crime occurrences includes receiving a plurality of time series datasets that are each associated with crime occurrences in a respective geographical region. A set of attributes that are associated with each geographical region are also received. Respective statistical feature sets are calculated from each of the time series of datasets. Based on the statistical feature sets, the respective geographical regions are associated with one of a plurality of clusters. Statistical measures of independence between the attributes associated with the geographical regions and the cluster are calculated. Based on these statistical measures of independence, at least one crime predictive rule is determined based on at least one statistical measure of independence meeting a threshold criteria.

DETAILED DESCRIPTION

In an embodiment, crime data is gathered from multiple law enforcement agencies (LEAs). This data is formatted and then analyzed to extract one or more crime patterns. For example, for a given jurisdiction (i.e., geographical area), there may be an intermittent, but extractable, pattern whereby drunk driving stops sometimes increase on the second Wednesday of the month. A similar extracted pattern may also appear in other jurisdictions. For example, another jurisdiction that appears unrelated (e.g., far distant, different population, different economy, different affluence, etc.) to the given jurisdiction may also exhibit an intermittent increase in drunk driving stops on the first Wednesday of the month.

Because (at least) two jurisdictions exhibit a statistically similar (or the same) crime pattern (e.g., drunk driving stops increasing on Wednesdays) they are grouped together in a cluster. The raw crime data for one jurisdiction in the cluster is then augmented with the raw data from another jurisdiction in the same cluster. This helps 'fill in the gaps' of the data from the first jurisdiction. The augmented crime data is then analyzed to extract crime patterns. The patterns extracted from the augmented crime data are then used to make crime forecasts with better accuracy. This may be particularly helpful to small jurisdictions where the number of crimes, and therefore the amount crime data, is relatively sparse.

In addition, certain characteristics (attributes) of each jurisdiction may be used to further classify the crime patterns within a cluster of jurisdictions. For example, the size, type of economy (e.g., manufacturing town, recreational town, university town, etc.) may be analyzed among the jurisdictions of a cluster to further extract more detail from the crime patterns that have been clustered. For example, take a cluster with six cities that all exhibit a roughly once-a-month spike in drunk driving arrests. However, among these six cities, the day of the month the increase occurs varies. By analyzing the patterns in these six cities in conjunction with the attributes of each city, more detail in the crime patterns may be extracted. For example, from the cities in the cluster, it may be determined that manufacturing towns are likely to exhibit the drunk driving increase on the payday of the towns largest employer, while university towns exhibit the increase shortly after major exams are taken.

Figure 1:
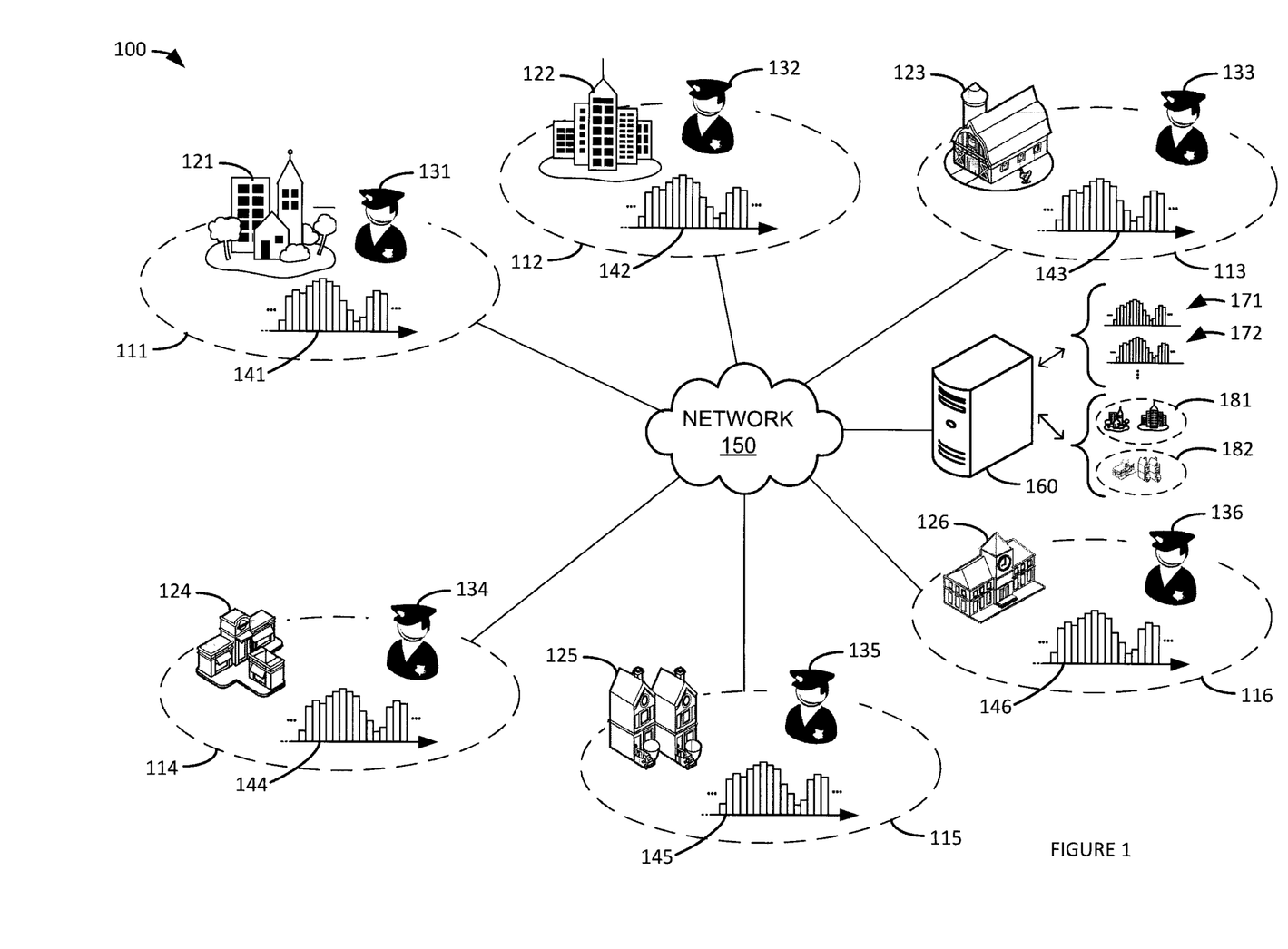
FIG. 1 is a diagram illustrating a crime forecasting system.

FIG. 1 is a diagram illustrating a crime forecasting system. In FIG. 1, geographical regions 111-116 are illustrated. Geographical regions 111-116 may be substantially non-overlapping. Geographical regions may correspond to, for example, one or more of the coverage area of a law enforcement agency (LEA), a county, a city, township, city block, and/or an arbitrarily selected area (e.g., a grid unit).

Each geographical region 111-116 is associated with respective attributes 121-126. These attributes may include or correspond to, for example, indicators of population, population density, economic status (e.g., percentage of population below poverty line, income percentile distribution, etc.), educational status (e.g., percentage of high school graduates, percentage of college graduates, percentage of post-graduates, etc.), and/or functional characteristic(s) (e.g., university town, port town, state capital, rust belt town, diversified economy town, retirement town, industrial city, suburban town, rural area, etc.)

Each geographical region 111-116 is policed by one or more law enforcement agencies 131-136. These law enforcement agencies 131-136 create, track, and maintain information about crimes that occur within their respective geographical regions 111-116. This crime information generated by law enforcement agencies 131-136 may be gathered and processed such that it is expressed as one or more time series datasets 141-146 that are associated with respective geographical regions 111-116. In other words, the crime information generated by law enforcement agencies can be arranged, filtered, or otherwise processed into a form that relates time information to crime occurrences in each of the geographical regions 111-116.

The time series datasets 141-146 may be gathered by, or pushed to, a crime forecasting system 160 via a network 150 (e.g., the internet). Based on these time series datasets, crime forecasting system may calculate respective time based crime patterns 171-172 (if any). These time based crime patterns 171-172 may be used by crime forecasting system 160 to associate geographical regions 111-116 with clusters 181-182 of other geographical regions that have statistically similar crime patterns 171-172.

For example, geographical region 111, geographical region 112, and geographical region 113 may have statistically similar (to each other) time based crime patterns (e.g., a statistically significant increase in the number of drunk driving arrests on Friday nights as compared to other days of the week.) Thus, crime forecasting system 160 would place geographical regions 111-113 into the same cluster 181. Likewise, geographical region 114, geographical region 115, and geographical region 116 may have statistically similar (to each other but not to regions 111-113) time based crime patterns (e.g., a statistically significant increase in the number of drunk driving arrests at the end of the month as compared to other days of the month.) Thus, crime forecasting system 160 would place geographical regions 114-116 into the same cluster 182.

In an embodiment, after clustering the detected crime patterns 171-172, crime forecasting system 160 may augment the time series dataset 141-146 for a geographical region 111-116 with the time series dataset(s) 141-146 from one or more geographical regions 111-116 that are in the same cluster 181-182. For example, to improve the accuracy of a crime pattern 171 associated with geographical region 111, crime forecasting system 160 may augment (e.g., sum, interleave, concatenate, resample, or otherwise combine) the time series dataset 141 that is from geographical region 111 (which, e.g., has been placed in cluster 181) with the time series dataset 142 that is from geographical region 112 (which, e.g., is also in cluster 181).

Based on the new (augmented) time series dataset, crime forecasting system 160 calculates a new time based crime pattern (if any) for the selected geographical region (e.g., region 111). Crime forecasting system 160 may then make crime forecasts for the selected region based on the crime pattern detected in the augmented time series dataset.

In an embodiment, forecasting system 160 may calculate statistical feature sets that are associated with the time series datasets 141-146 that forecasting system 160 receives. For example, forecasting system 141-146 may, for each geographical region, calculate: (1) a mean number of crimes; (ii) a frequency of hotspots (i.e., the number of times the geographical region has been a hotspot over a selected time window); (iii) normalized number of crimes; (iv) rank of the geographical region when sorted with the highest number of crimes being the highest rank (e.g., ranked #1.) During the ranking process, ties may be broken, for example, using the average ranks of the region in the past.

In an embodiment, forecasting system 160 may calculate statistical feature sets from the sets of time series datasets 141-146. In an embodiment, forecasting system 160 may use a Maharaj's distance metric. A Maharaj's distance is indicative of a moving average factor along with the number of changes in direction in a time series dataset 141-146. The Maharaj's distance may be used to provide a similarity metric for the time series datasets 141-146 from the geographical regions 111-116. Forecasting system 160 may scale a given statistical feature to the range between 0 and 1 to indicate a relative strength of the feature in the time series dataset 141-146. A statistical feature having a strength value close to 0 indicates minimal existence of the statistical feature. A statistical feature having a strength value close to 1 indicates strong existence. The statistical features are obtained from the individual time series datasets 141-146 from the geographical regions 111-116.

In an embodiment, the statistical features can include trend, seasonality, serial correlation, non-linearity, skewness, kurtosis, self-similarity, chaos, frequency of periodicity, average Maharaj Distance, moving average factor, and number of direction changes. It should be appreciated that in some embodiments, other statistical features may be calculated. Among these statistical features, some are present only in the original time series dataset. However, some statistical features may be detected after de-trending and de-seasonalizing the data.

In an embodiment, forecasting system 160 uses the Average Maharaj distance for statistical feature extraction. An Autoregressive Moving Average (ARMA) time series with autoregression parameter p and moving average parameter q can be defined according to equation (1) as follows:

$$Y_T = \lambda + \sum_{i=1}^{p} \psi_i Y_{T-i} + \sum_{i=1}^{q} \theta_i \epsilon_{T-i} + \epsilon_T \qquad (1)$$

In Equation (1), $\lambda$ is a constant, $\epsilon_i$'s _is are white noise, $\psi_i$'s are the autoregression parameters and $\theta_i$'s are the moving average parameters. For such ARMA processes, discrepancy measures based on hypotheses testing can be used to determine whether or not two time series datasets 141-146 $X_T$ and $Y_T$ have significantly different (or significantly the same) generating processes. The output metric of the ARMA process is called the Maharaj distance. The Maharaj distance may be used by forecasting system 160 to determine whether one or more time series dataset 141-146 are similar to each other. A p-value is computed from the Maharaj distance which lies between 0 and 1. A p-value close to 1 indicates that a selected two time series datasets 141-146 are similar. A p-value close to 0 indicates that a selected two time series datasets are different. For purposes of feature extraction, the average Maharaj distance (AMD) for the time series related to the i-th region can computed as according to Equation (2) as follows:

$$\Sigma_{j=i}^{N} MD_{ij}/(N-1) \qquad (2)$$

In Equation 2, $MD_{ij}$ is the Maharaj distance of the time series from geographical region i from the time series from geographical region j, and N is the total number of geographical regions. Thus, equation (2) gives the average dissimilarity of a given geographical region from the other geographical regions.

The number q as defined in Equation 1 is thus a moving average factor. In addition, the number of direction change can be determined. For a certain geographical region 111-116, an increase or decrease in crime is an important indicator of the overall crime pattern of that geographical region 111-116. If the number of crimes increases frequently from a previous time interval, then that can be a differentiating factor as compared to those regions where crime patterns remain static. The number of changes in direction in the time series datasets 141-146 may therefore be determined by forecasting system 160. Specifically, for a geographical region's data $Y_T$, a function δT such that δ1=δ2+0. Accordingly, equation (3) expresses:

$$\delta_T = \begin{cases} 0 & \text{if } Y_T \geq Y_{T-1} \geq Y_{T-2} \text{ or } Y_T \leq Y_{T-1} \leq Y_{T-2} \\ 1 & \text{otherwise} \end{cases} \quad (3)$$

Let $\Delta = T\delta T$. Then $\Delta$ is the sum of the number of direction changes and is taken to be a statistical feature.

Based on the calculated statistical feature sets, forecasting system 160 may then associate the respective geographical regions 111-116 with one of a set of clusters. In order to cluster the geographical regions 111-116, forecasting system 160 may, for each statistical feature set, identify feature distributions. Forecasting system 160 may use a mixture model-based to cluster the geographical regions.

Forecasting system 160 may use candidate list of mixture distributions C that includes a Gaussian mixture, a t mixture, a chi-square mixture, a Poisson mixture, and an inverse Gaussian mixture. For this discussion, $M_k$ is the kth member of C. $Y_{Ti}$ is the set of extracted features. $M_k$ can then be fit to $Y_{Ti}$ and an estimation of the parameters using an Expectation Maximization (EM) algorithm is performed by forecasting system 160. The fitted likelihood is denoted L. The Bayesian Information Criteria (BIC) is used to extract information from the fitted model. BIC for a fitted model with likelihood L is defined in equation (4) as:

$$\text{BIC} = 2 \log \mathcal{L}(\hat{\sigma}|x) - \rho \log n \quad (4)$$

where x is the dataset, $\hat{\sigma}$ is the maximum likelihood estimate (MLE) of the parameter set σ, p is the number of free parameters, and n is the number of observations. $\text{BIC}_k$ is the information theoretic criteria corresponding to the kth member of C. Equation (5) can then be defined as follows:

$$k_0 = \underset{k}{\text{argmax}} \, BIC_k \quad (5)$$

$M_{k_0}$ is the best fitted mixture model for the dataset. Thus, in an embodiment, forecasting system 160 chooses the mixture distribution (e.g., Gaussian, Poisson, etc.) that gives the highest information based on the time series data and uses these selections to cluster the geographical regions 111-116. In other words, all the geographical regions with the same (or statistically similar) mixture distributions are associated with the same cluster.

Forecasting system 160 may then calculate statistical measures of independence between the attributes 121-126 associated with the geographical regions 111-116 in a given cluster 181-182 and the cluster. These statistical measures of independence may be used by forecasting system 160 to determine crime predictive rules. For example, forecasting system 160 may consider a set of hypothetical rules of the form X results in Y, where X is a cluster 181-182 and Y is an attribute 121-126. In other words, if a geographical region 111-116 is in cluster X, then does the Y attribute help identify a likelihood of when/where a crime will occur. Forecasting system 160 uses a validity ranking of the hypothetical rules that is based on the lift value. A lift value is the ratio of the observed support to that expected if the antecedent (left hand side—LHS) and consequent (right hand side—RHS) were independent. A lift value of greater than 1 implies that the LHS (i.e., being in cluster X) and RHS (having the attribute Y) are dependent on one another. The greater the value of lift, the greater the degree of dependence between the hypothetical rule and the attribute. In an embodiment, hypothetical rules are selected by forecasting system 160 as predictive rules when their lift values exceed a threshold criteria. In an embodiment, when the lift value of a hypothetical rule exceeds 1.25, that rule is selected a useful predictive rule.

Forecasting system 160 may cross-validate these predictive rule selections using probability distribution analyses. For example, assume a situation where, for murder, forecasting system 160 has assigned geographical regions to four clusters. If each attribute 121-126 (e.g., university town) was uncorrelated to the crime pattern, forecasting system 160 will recognize a uniform distribution where a given university town is 25% likely to belong a particular one of the four murder clusters. However, if forecasting system 160 recognizes that 63% of university towns were in cluster #2, forecasting system 160 determines that attribute 121-126 to confirm the selection of the rule regarding a university town attribute as being predictive for murder.

Figure 2:
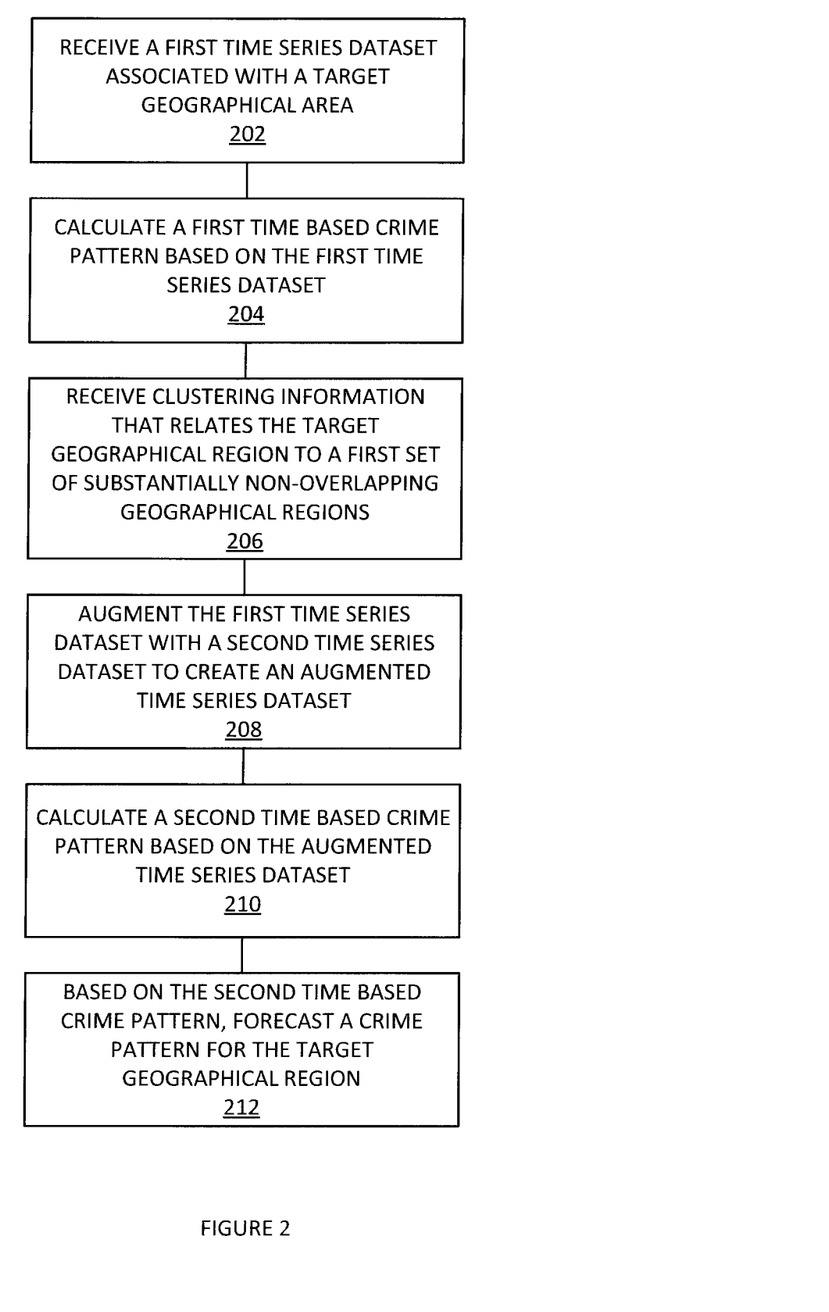
FIG. 2 is a flowchart illustrating a method of operating a crime forecasting system.

FIG. 2 is a flowchart illustrating a method of operating a crime forecasting system. The steps illustrated in FIG. 2 may be performed by one or more elements of crime forecasting system 100. A first time series dataset associated with a target geographical area is received (202). For example, forecasting system 160 may receive time series dataset 141 which is associated with geographical region 111. Time series dataset 141 may be gathered by, or pushed to, forecasting system 160 via a network 150.

A first time based crime pattern based on the first time series dataset is calculated (204). For example, time based crime pattern 171 may be extracted from time series dataset 141. Clustering information that relates the target geographical region to a first set of substantially non-overlapping geographical regions is received (206). For example, each geographical region 111-116 may be associated with a one of clusters 181-182 so that the members of a given cluster 181-182 have statistically similar crime patterns 171-172. The results of this clustering may be received/generated by forecasting system 160.

The first time series dataset is augmented with a second time series dataset to create an augmented time series dataset (208). For example, time series dataset 141 may be augmented with time series dataset 142. Time series dataset 142 may be selected to provide the augmentation data based on geographical region 112 being in the same cluster 181 as geographical region 112.

A second time-based crime pattern is calculated based on the augmented time series dataset (210). For example, forecasting system 160 may calculate a second (improved) crime pattern based on the augmented dataset created by augmenting time series dataset 141 with time series dataset 142.

Based on the second time based crime pattern, a crime pattern is forecast for the target geographical region (212). For example, the second (improved) crime pattern may be used to forecast a crime pattern in geographical region 111.

Figure 3:
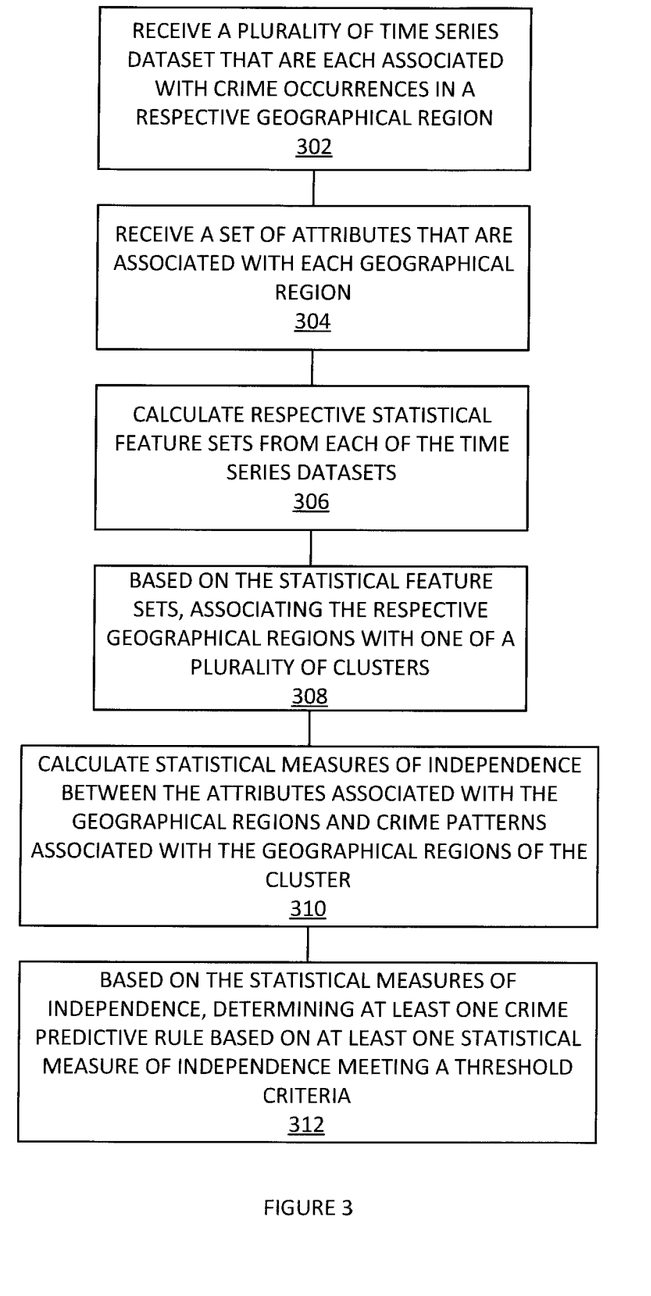
FIG. 3 is a flowchart illustrating a method of forecasting crime occurrences.

FIG. 3 is a flowchart illustrating a method of forecasting crime occurrences. The steps illustrated in FIG. 3 may be performed by one or more elements of crime forecasting system 100. A plurality of times series datasets that are each associated with crime occurrences in a respective geographical region are received (302). For example, time series datasets 141-146, which are respectively associated with geographical regions 111-116, may be gathered by, or pushed to, crime forecasting system 160 via a network 150.

A set of attributes that are associated with each geographical region are received (304). For example, forecasting system 160 may receive attributes 121-126 that are respectively associated with geographical regions 111-116. These attributes may include or correspond to, for example, indicators of population, population density, economic status (e.g., percentage of population below poverty line, income percentile distribution, etc.), educational status (e.g., percentage of high school graduates, percentage of college graduates, percentage of post-graduates, etc.), and/or functional characteristic(s) (e.g., university town, port town, state capital, rust belt town, diversified economy town, retirement town, industrial city, suburban town, rural area, etc.)

Statistical feature sets are calculated from each of the time series datasets (306). For example, forecasting system 160 may determine, from each time series dataset 141-146, statistical features that include one or more of trend, seasonality, serial correlation, non-linearity, skewness, kurtosis, self-similarity, chaos, frequency of periodicity, average Maharaj Distance, moving average factor, and number of direction changes.

Based on the statistical feature sets, the respective geographical regions are associated with one of a plurality of clusters (308). For example, geographical regions 111-116 with the same (or statistically similar) mixture distributions may be associated by forecasting system 160 with the same cluster.

Statistical measures of independence between the attributes associated with the geographical regions in the cluster and the cluster are calculated (310). For example, if forecasting system 160 has assigned geographical regions to four clusters, and a given attribute 121-126 (e.g., university town) is uncorrelated to the crime pattern, forecasting system 160 will recognize a uniform distribution where a given region 111-112 with the given attribute is 25% likely to belong a particular one of the four clusters. However, if forecasting system 160 recognizes that a much higher percentage (e.g., 50%) of towns with the given attribute were in a particular cluster, forecasting system 160 determines that the membership in a particular cluster is dependent upon the given attribute 121-126.

Based on the statistical measure of independence, at least one crime predictive rule base on at least one statistical measure of independence meeting a threshold criterion (312) is determined. For example, forecasting system 160 uses a validity test of the hypothetical rules that is based on the lift value. Hypothetical rules are selected by forecasting system 160 as predictive rules when their lift values exceed a threshold criterion. For example, when the lift value of a hypothetical rule exceeds 1.25, that rule is selected as a useful predictive rule.

Figure 4:
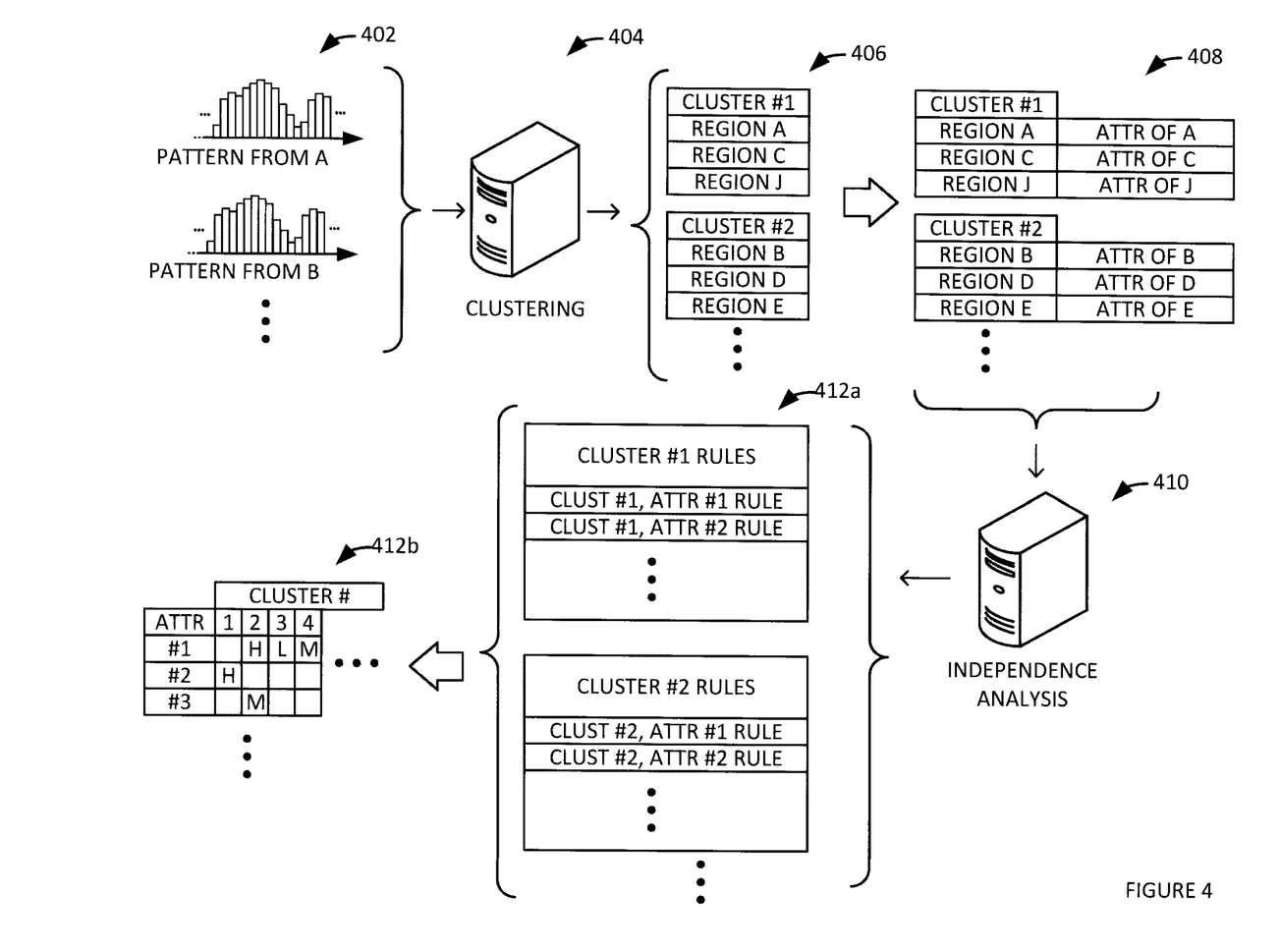
FIG. 4 is a diagram illustrating the generation of rules for crime forecasting.

FIG. 4 is a diagram illustrating the generation of rules for crime forecasting. In FIG. 4, a set of crime patterns 402 from geographical regions (e.g., geographical region A, geographical region B, etc.) are provided to processing node 404 for clustering. Processing node 404 clusters (e.g., into cluster #1, cluster #2, etc.) these geographical regions based on the statistical similarities among the crime patterns 402.

Each geographical region in a cluster is associated with a set of attributes 408. The association between the clusters and the presence/absence of an attribute among the members of the clusters is analyzed for dependence/independence by processing node 410. A set of crime predictive rules 412a, 412b is extracted from the dependence/independence analysis. In other words, if a particular attribute is statistically significant in predicting the membership of a region in a particular cluster, a rule that relates the attribute to the cluster may be selected by processing node 410 as predictive. For example, rules may be selected as predictive rules when their lift values exceed a threshold criterion. For example, when the lift value of a rule exceeds 1.25, processing node 410 selects that rules as a useful predictive rule.

Figure 5:
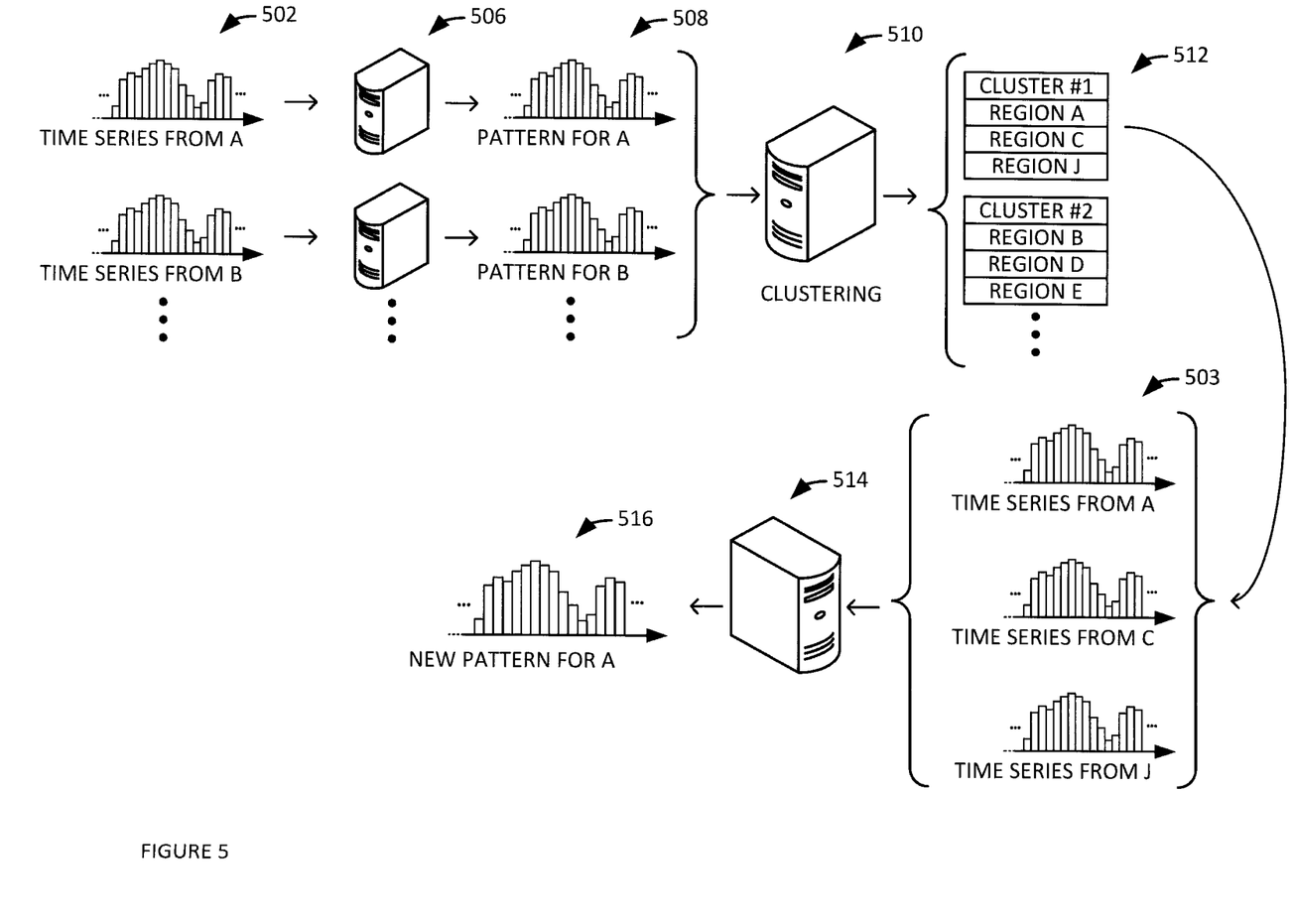
FIG. 5 is a diagram illustrating augmented crime pattern analysis.

FIG. 5 is a diagram illustrating augmented crime pattern analysis. In FIG. 5, time series dataset 502 from geographical regions (e.g., geographical region A, geographical region B, etc.) are provided to processing node(s) 506. Processing nodes 506 extract crime patterns 508 from the times series datasets. These crime patterns 508 may be based on one or more of trend, seasonality, serial correlation, non-linearity, skewness, kurtosis, self-similarity, chaos, frequency of periodicity, average Maharaj Distance, moving average factor, and number of direction changes.

Crime patterns 508 that are associated with geographical regions (e.g., geographical region A, geographical region B, etc.) are provided to processing node 510 for clustering. Processing node 510 clusters (e.g., into cluster #1, cluster #2, etc.) these geographical regions based on the statistical similarities among the crime patterns 510.

To improve the quality of a crime pattern 508 associated with a selected region, the time series dataset 502 from a region is augmented with one or more time series datasets 502 from the other geographic regions in the same cluster as the selected region. This augmented dataset 503 is provided to processing node 514 to generate a new (improved) crime pattern 516.

Figure 6:
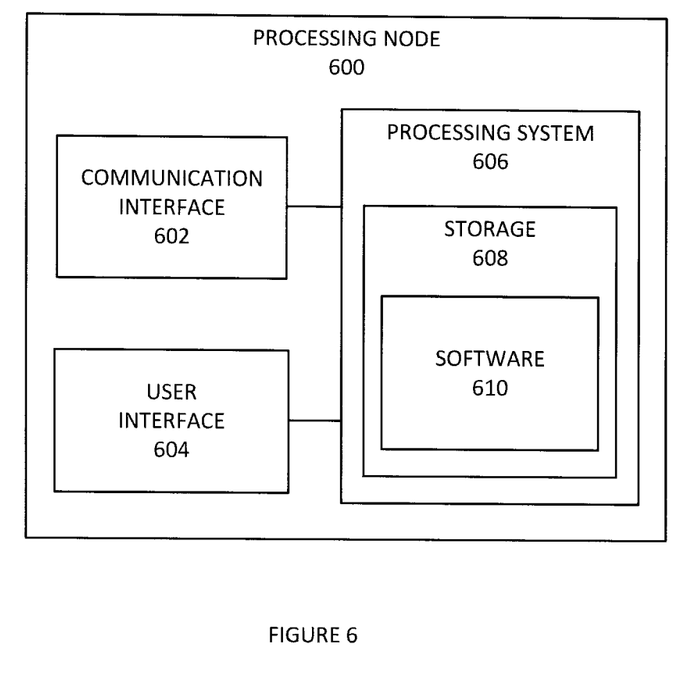
FIG. 6 illustrates a processing node.

FIG. 6 illustrates an exemplary processing node 600 comprising communication interface 602, user interface 604, and processing system 606 in communication with communication interface 602 and user interface 604. Processing node 600 is capable of paging a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 includes crime forecasting system 160, processing nodes 404, 410, 506, 510, and 514. Processing node 600 can also be an adjunct or component of a network element, such as an element of network 150.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a crime forecasting system, comprising:
   receiving a first time series dataset associated with a target geographical region, the first time series dataset relating time information to crime occurrences in the target geographical region;
   calculating a first time based crime pattern based on the first time series dataset;
   receiving clustering information that relates the target geographical region to a first set of substantially non-overlapping geographical regions, the first set of non-overlapping geographical regions including the target geographical region;
   augmenting the first time series dataset with a second time series dataset to create an augmented time series dataset, the second time series dataset to be based on at least one time series dataset relating time information to crime occurrences in at least one of the first set of non-overlapping geographical regions that are not the target geographical region;
   calculating a second time based crime pattern based on the augmented time series dataset; and
   based on the second time based crime pattern, forecasting a crime pattern for the target geographical region,
   wherein the at least one time series dataset relating time information to crime occurrences correspond to members of a subset of the first set of non-overlapping geographical regions that are not the target geographical region,
   wherein the subset is selected based on at least one attribute associated with both the target geographical region and each of the subset,
   wherein the at least one attribute is associated with at least one of population, demographics, economy, education, and land use,
   wherein the at least one attribute is further associated with a proximity to at least one of a law enforcement facility, educational facility, and transportation facility, and
   wherein the at least one attribute is predictive of a crime from the forecasted crime pattern.

2. The method of claim 1, wherein the clustering information that relates the target geographical region to the first set of substantially non-overlapping geographical regions is based on statistical similarities between respective time based crime patterns associated with the first set of substantially non-overlapping geographical regions.

3. The method of claim 1, wherein the clustering information that relates the target geographical region to the first set of substantially non-overlapping geographical regions is based on statistical differences between respective time based crime patterns associated with a second set of substantially non-overlapping geographical regions, the second set of substantially non-overlapping geographical regions not sharing any common members with the first set of substantially non-overlapping geographical regions.

4. A method of forecasting crime occurrences, comprising:
   receiving a plurality of time series datasets that are each associated with crime occurrences in a respective geographical region;
   receiving a set of attributes that are associated with each geographical region;
   calculating respective statistical feature sets from each of the time series of datasets;
   based on the statistical feature sets, associating the respective geographical regions with one of a plurality of clusters;
   calculating statistical measures of independence between the attributes associated with the geographical regions and crime patterns associated with the geographical regions of the cluster; and
   based on the statistical measures of independence, determining at least one crime predictive rule based on at least one statistical measure of independence meeting a threshold criteria,
   wherein the at least one attribute is associated with at least one of population, demographics, economy, education, and land use, and
   wherein the at least one attribute is further associated with a proximity to at least one of a law enforcement facility, educational facility, and transportation facility, and
   wherein the at least one attribute is utilized in determining the at least one crime predictive rule.

5. The method of claim 4, wherein the statistical feature sets correspond to patterns, in time series datasets, that relate crime occurrences to time information.

6. The method of claim 4, wherein associating the geographical regions with one of a plurality of clusters is based on measurements of similarity between clusters as compared to similarity within clusters.

7. The method of claim 4, wherein the attributes comprise demographic attributes and functionality attributes.

8. The method of claim 4, wherein the statistical measures of independence relate a statistical dependence of crime occurrences in the geographical regions to the attributes associated with the geographical regions.

9. The method of claim 4, wherein the respective statistical feature sets are based at least in part on a feature distribution.

10. The method of claim 9, wherein the feature distribution may be selected from a set comprising one or more of gaussian, t, chi-square, poisson and inverse gaussian.

11. A crime pattern prediction system, comprising:
- a network interface to receive a first time series dataset associated with a target geographical region, the first time series dataset relating time information to crime occurrences in the target geographical region, the network interface to also receive clustering information that relates the target geographical region to a first set of substantially non-overlapping geographical regions, the first set of non-overlapping geographical regions including the target geographical region;
- a processor; and,
- a non-transitory computer readable medium having instructions stored thereon that, when executed by the processor, at least instruct the processor to:
  - calculate a first time based crime pattern based on the first time series dataset;
  - augment the first time series dataset with a second time series dataset to create an augmented time series dataset, the second time series dataset to be based on at least one time series dataset relating time information to crime occurrences in at least one of the first set of non-overlapping geographical regions that are not the target geographical region;
  - calculate a second time based crime pattern based on the augmented time series dataset; and
  - based on the second time based crime pattern, forecast a crime pattern for the target geographical region, wherein the at least one time series dataset relating time information to crime occurrences correspond to members of a subset of the first set of non-overlapping geographical regions that are not the target geographical region, wherein the subset is selected based on at least one attribute associated with both the target geographical region and each of the subset, wherein the at least one attribute is associated with at least one of population, demographics, economy, education, and land use, wherein the at least one attribute is further associated with a proximity to at least one of a law enforcement facility, educational facility, and transportation facility, and wherein the at least one attribute is predictive of a crime from the forecasted crime pattern.

12. The system of claim 11, further comprising:
- a display to present a forecasted crime pattern for the target geographical region.

13. The system of claim 12, wherein the clustering information that relates the target geographical region to the first set of substantially non-overlapping geographical regions is based on statistical similarities between respective time based crime patterns associated with the first set of substantially non-overlapping geographical regions.

* * * * *